United States Patent Office 3,284,331
Patented Nov. 8, 1966

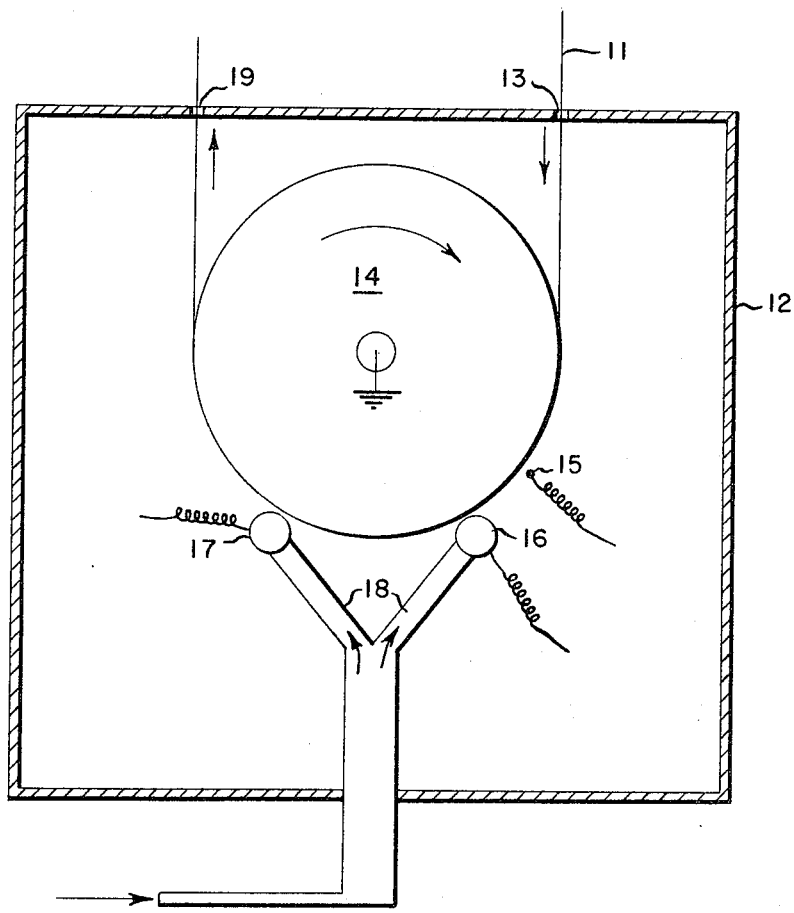

3,284,331
ADHERABILITY TREATMENT OF THERMO-
PLASTIC FILM
Richard T. McBride, Buffalo, and John H. Rogers, Jr.,
Kenmore, N.Y., assignors to E. I. du Pont de Nemours
and Company, Wilmington, Del., a corporation of Delaware
Filed June 10, 1965, Ser. No. 469,026
2 Claims. (Cl. 204—165)

This application is a continuation-in-part of our copending application Serial No. 121,504, filed July 3, 1961, now abandoned.

This invention relates to treatment of organic thermoplastic polymeric surfaces to render the surfaces more wettable by water and/or other liquids, more printable and dyeable and, in general, more adherable.

The treatments commonly employed for rendering the surfaces of polymeric structures such as polymeric films more adherable involve passing the film in contact with a continuously moving supporting surface, e.g. a roller, a drum, a cylinder or an endless belt while subjecting the surface of the film remote from the supporting surface to treatment by gases, flames, or an electrical discharge.

In these so-called adherable processes it is difficult to confine the effect of the treatment to the exposed surface of the polymeric film. The usual result is that the film surface in contact with the supporting drum or the like becomes adherable as well. For some uses, this result is not tragic. However, there are many applications where it is not only desirable but critical to confine the adherability treatment to one, and only one surface of the polymeric film. Some examples, by no means exhaustive, are provided in the following paragraphs.

When a flat polyolefin web, e.g. polyethylene, polypropylene, etc. is being treated to render one surface "printable," the accidental treatment of the opposite surface, even to a degree insufficient to render it "printable," tends to provide inks offset during storage of the printed rolls. When flat webs of such films are converted into bags, the longitudinal seam thereof is conventionally made as a back-to-front heat seal. With treated polyolefin films, it has been found that the ultimate strength of treated-to-untreated heat seals is usually less than that of untreated-to-untreated heat seals with treated-to-treated heat seals running a poor third. Furthermore, the accidental treatment of the opposite surface of a flat polyolefin web or of the inside surfaces of a flattened seamless polyolefin tube increases the tendency of some granular or powdery substances to cling to the surfaces.

Many polymeric films are employed as surfacings for other materials with which they are combined in laminated constructions to take advantage of the chemical inertness, soil and stain resistance and low surface adherability (i.e. release properties) of the surface film. Among polymers which may be thus employed are polyethylene terephthalate, polyvinyl fluoride, polyvinylidene fluoride, vinyl fluoride/vinylidene fluoride interpolymers, polychlorotrifluoroethylene, polytetrafluoroethylene, interpolymers of tetrafluoroethylene with hexafluoropropylene, vinyl fluoride/tetrafluoroethylene interpolymers, vinylidene fluoride/tetrafluoroethylene interpolymers, vinylidene fluoride/hexafluoropropylene interpolymers, polyvinyl chloride, vinyl chloride/vinyl acetate interpolymers, vinyl chloride/vinylidene chloride interpolymers, polyoxymethylene, polyacrylonitrile and polyamides. However, in the treatment of one surface of the film of any of these polymers to render it laminable to a supporting structure, the accidental treatment of the opposite surface tends to defeat the purpose for which the polymeric film was primarily selected.

The object of this invention is to provide a method for treating polymeric structures in a manner that confines the results of the treatment substantially to a single surface. A further object is to treat polymeric films by electrical discharge means to render only one surface adherable. Other objects will appear hereinafter.

The objects are accomplished by passing organic thermoplastic polymeric film onto an electrical grounded moving surface; depositing on the upper surface of the film in a continuous and uniform manner an electrostatic charge sufficient to cause the film to adhere firmly to the moving surface prior to submitting the film to the adherability treatment of its upper surface; and maintaining firm adhesion during the adherability treatment.

Specifically, the process involves passing the organic thermoplastic polymeric film onto an electrically grounded moving surface; depositing an electrical charge of at least 0.23 microcoulomb per square inch on the upper surface of the film at least adjacent to each side edge of the film, preferably along a line or band across the complete width of the film in a continuous and uniform manner, the charge being sufficient to cause the film to adhere firmly to the moving surface; and thereafter subjecting the film to an electrical discharge at substantially atmospheric pressure between spaced electrodes, one of which is the electrically grounded moving surface, continuously applying to said electrodes an alternating current at a voltage in excess of 1,000 volts and at a frequency in excess of 350 cycles per second in an atmosphere effective to create an electrical discharge between the electrodes.

The preferred embodiment of the invention is illustrated schematically in the accompanying drawing, in which 11 represents the polymeric film. The film 11 is fed into chamber 12 through entrance opening 13 by means not shown. The film 11 is passed to and around an electrically grounded rotatable roll 14, rotated by means not shown.

At or after the point at which the polymeric film 11 first touches the roll 14 is disposed one or more electrodes 15. The electrode 15 may be a wire electrode having a diameter of 0.001–0.125 inch and made of tempered steel. Any other metallic conductor having adequate strength and dimensional stability may be employed as the electrode. Such materials include tungsten, "Inconel"—a nickel-iron alloy, "Monel"—a nickel alloy, copper, brass, stainless steel, etc. The wire electrode is supplied from a D.C. power supply (not shown). Sufficient voltage which is usually between 15 and 30 kilovolts is supplied from the D.C. power supply through a high voltage supply cable to the wire electrode 15 to provide at least 0.23 microcoulomb per square inch on the upper surface of the film and thus to force the film 11 into intimate contact with the positively-driven roll 14. Instead of a wire electrode, a knife edge electrode or needle probe electrodes may be used.

To obtain the deposition of at least 0.23 micro-coulomb per square inch, several critical requirements must be followed.

(1) A positive or negative current, but not both, must be used. A direct current (D.C.) voltage supply is generally used for this purpose. It is also possible to use a pulsating supply superimposed on a D.C. supply if the polarity of the resultant current does not undergo any change, i.e. remains either positive or negative.

(2) A non-uniform electrostatic field gradient must be established between the distributor of electricity (the electrode) and the grounded roll or belt over which the film passes so that the field is substantially higher immediately adjacent to the electrode than immediately adjacent to the film on the roll or belt. Specifically, the electrostatic field gradient in the vicinity of the electrode must be sufficient to ionize the medium (usually air) in that region, i.e., it must be at least 30,000 volts/centimeter for air. In the vicinity of the film, the electrostatic field must be below 30,000 volts/centimeter to prevent ionization of the air. Ionization of the air in the region near the film will tend to affect the film adversely, perhaps even charring the film.

(3) The current measured adjacent to the film should be correlated with the speed of the film so that the current is at least 5 microamperes/square yard of film on which the deposit of electrostatic charge is sought/minute.

The non-uniform electrostatic field gradient is obtained by a critical design of the electrode. The design should be such that a uniform surface is presented to the film, the surface containing no more than 0.39 square inch (0.125 inch in diameter) per linear inch of the electrode, preferably no more than 0.015 square inch per linear inch of the electrode, the surface area measured in a plane through the extremities of the electrode. More accurately, this area of the electrode that is "seen" by the film is measured as a projected area on the plane through the electrode's extremities nearest the film. The maximum preferred surface may be obtained by using a substantially cylindrical electrode such as at least one fine wire of up to 0.125 inch diameter or a knife edge having a radius of curvature of up to 0.005 inch. Theoretically, there is no precise minimum surface that can be specified for the electrode, below which one cannot produce the non-uniform electrostatic field gradient. However, a surface of less than 0.0016 square inch per linear inch for a wire electrode is not sufficiently durable to be practical in the present invention and, in general, a minimum of 0.003 square inch per linear inch is preferred. A knife edge electrode could be sharper (have a finer diameter) than a wire electrode while retaining adequate strength. The most effective electrode is a fine wire having a diameter of 1–20 mils.

The D.C. voltage supply must be capable of producing very low current, on the order of 5–240 microamperes per square yard per minute at a voltage of 2–30 kilovolts. The minimum of 2 kilovolts has been found necessary to provide the proper electrostatic field gradient of at least 30,000 volts per centimeter for air at the surface of the critical electrode where the distance between the electrode and the film approaches 0.025 inch and the film speed approaches a minimum of 2 feet per minute. The amount of voltage necessary in any particular case is that required to deposit initially at least 0.23 microcoulomb per square inch of material but less than an amount that would cause breakdown of the material. The voltage necessary will depend on the speed of the film as it passes the electrode, the distance of the electrode from the surface of the film, electrical properties of the polymer, the relative stiffness of the film, the severity of wrinkling or gauge disuniformity of the film, film width, thickness and temperature, environmental conditions such as ambient relative humidity, and the effectiveness of the particular electrode configuration. Generally, the speed of the film may vary anywhere from a few feet per minute to 500 yards per minute or higher and the distance between the electrode and the film may be anywhere from 0.025 to 5 inches, preferably 0.025 to 0.5 inch.

In general it has been found that the minimum voltage which must be applied to electrode 15 for efficient adherence of the film 11 to roll 14 tends to increase with increases in film width, speed, thickness, stiffness, degree of wrinkling or gauge disuniformity, distance from electrode 15 to film surface and ambient relative humidity. As the temperature of a polymeric film increases, film stiffness tends to decrease while most polymers exhibit some decrease in volume resistivity. The higher current leakage (at lower volume resistivities) tends to increase the minimum voltage requirements while reduced film stiffness tends to decrease the minimum voltage requirements. The relative magnitude of these opposing effects will vary from polymer to polymer and only experience will demonstrate whether there will exist any real net effect.

After passing through the field established by electrode 15, the film 11 is passed under one or more hollow tubes 16 and 17. The tubes are disposed parallel to the longitudinal axis of the roll 14 and spaced a distance of 0.008–0.25 inch from a surface thereof. The tubes are each connected electrically to a suitable power source, not shown, which supplies to each tube electrode an alternating (or pulsating direct) current of 0.3 to 5.5 root mean square (R.M.S.) amperes at a voltage on the order of 1,000 volts up to pulsating peak voltages of 100,000 and above. In general, it is preferred to maintain the voltage in excess of about 2,000 and 3,000 volts. Frequencies of 350 up to 1,000,000 cycles per second or more can be used. A high frequency spark generator such as is illustrated in the examples below provides a frequency in the range of 300,000 to 500,000 cycles per second and produces effective treatment at commercially acceptable exposure times. Other power sources such as a motor generator or a vacuum tube oscillator can be used. The atmosphere, usually nitrogen, in which the electrical discharge is conducted, is continuously fed to the hollow interior of the electrode tubes through distributor ducts 18. The gas issues from the tubes at the gap between each tube and the ground roll 14 through a narrow slot running lengthwise of each electrode tube. The thus treated continuously moving film 11 is withdrawn from chamber 12 through the exit opening 19.

It should be understood that the film may be treated at normal room temperature or at elevated temperatures. In general, the effectiveness of the treatment increases with temperature. The effectiveness of the treatment also increases as the amount of current to the treated electrodes 16 and 17 for a given area of electrode and time exposure increases. For practical purposes, the current of 0.5–2.5 root mean square amperes provides reasonable treating times while avoiding excessive degradation of the electrodes.

As stated previously, the treating electrode gap may range from 0.008 inch to about 0.25 inch. However, some improvement can be obtained with an electrode gap as low as 0.005 inch or as high as 0.5 inch provided adjustments in the amount of current, the electrode dimensions and/or exposure time are made. Where the grounded drum is covered with a relatively thick dielectric coating and where the apparatus is being used to treat relatively thick films (50 mils and up), the higher electrode gaps are necessarily employed.

It should be understood that the electrically grounded moving roll 14 may be any suitable moving surface (belt or chain). The surface may actually be a polyethylene-coated, polytetrafluoroethylene-coated or other plastic-coated surface or a surface finished with silica, glass or a non-conductive aluminum oxide or other oxide coating. In these cases, one might regard the coating on the metallic surface and the polymeric film passing thereover as a single insulator. The total thickness of such insulator (coating plus film) should be no greater than about 150 mils for effective operation. Thus, where the electrically grounded moving surface is an uncoated metallic roll, belt or chain, the thickness of the film may be up to about 150 mils. For most films, however, where the thickness of the film is no greater than about 25 mils, the roll, belt or chain could be a grounded electrical conductor with a thin non-conductive coating of up to about ⅛ inch (125 mils). Of course, the thinner the insulator the more efficient the treatment obtained. The thinnest film operable in the present invention is determined by practical considerations. It is difficult to process films in accordance with the present invention where the thickness of the film is less than about ¼ mil.

A particular useful application of the invention is the treatment of perfluorocarbon polymers, e.g. polytetrafluoroethylene and copolymers of 50–95% by weight tetrafluoroethylene with, correspondingly, 50–5% hexafluoropropylene. These polymers are employed for their antisticking or release properties. Their preparation and characteristics are described in U.S. Patent 2,833,686. Because of their relatively high cost, perfluorocarbon polymeric films are generally employed as part of laminates in combination with less expensive materials. The cheaper materials serve to support the perfluorocarbon polymeric films, while the latter provide chemical inertness and the release property. For the successful manufacture of these laminates, it is essential to render only one surface of the perfluorocarbon polymeric film cementable. The process of this invention prevents the untreated surface of the film from showing any undesirable affinity for inks, adhesives or other resinous coatings. Although any polymeric material can be treated in accordance with the process of this invention, the preferred polymers for treatment in the form of self-supporting films are the perfluorocarbon polymers such as polytetrafluoroethylene and copolymers of tetrafluoroethylene with hexafluoropropene; polyvinylchloride, linear polypropylene, linear polyethylene and polyethyleneterephthalate.

The successful treatment of polymeric films to render a single surface of the films receptive to inks, adhesives, etc. while at the same time preserving the desirable properties of the opposite surface is demonstrated by the following examples. Surprisingly, it will be noted that, despite the fact that the film surface on which the electrostatic charge has been deposited subsequently passes through a rapidly and continually polarity-reversing ionized atmosphere, the effect of the treatment of this invention is only obtained when the combination of two electrical treatments is employed.

This invention will be further explained by reference to the following examples which are given for purposes of illustration only and not by way of limitation.

*Examples 1–13*

Each film in a series cast from tetrafluoroethylene/hexafluoropropylene copolymers containing about 15 weight percent of hexafluoropropylene was subjected to the D.C. electrical treatment followed by the high frequency electrical spark discharge treatment on one surface. The apparatus employed was essentially that depicted in the drawing. Each film was continuously passed through the film entry port into the chamber enclosing the treating apparatus and into contact with the electrically-grounded, 40-inch long, 8-inch diameter, rotating steel roll. The surface of the roll was protected by a glass coating about 70 mils thick. Two 40-inch long, 1.5-inch O.D. stainless steel tubes, each connected to a high frequency electrical spark generator served as the treating electrodes. These electrodes were disposed parallel to the longitudinal axis of the steel roll, in close proximity to its surface and spaced about 11 inches apart. The first tube electrode was spaced about 2 inches from the wire electrode used in the preliminary D.C. treatment.

Nitrogen was bubbled continuously at the rate of about 4 to 7.5 cubic feet per minute at about 15–30 p.s.i.g. through liquid glycidyl methacrylate and then to the hollow interior of the treating electrodes through non-electrically conductive distributor ducts, i.e. rubber tubes. The resulting gas/vapor mixture continuously issued from the electrode tubes at the gap between each tube and the grounded roll through a narrow (approximately 6–8 mils wide) slot running lengthwise of each electrode tube. After passing between the grounded roll and the second treating electrode, the film was conducted from the enclosing chamber through the film exit port.

A model H.F.S.G.–2 High Frequency Spark Generator (manufactured by Lepel High Frequency Laboratories, Inc., Woodside, New York) was connected to each treating tube electrode. Model H.F.S.G.–2 is a spark gap-excited high frequency oscillator specifically designed to generate a high frequency, high voltage electrical discharge between two electrodes and is adjustable to accommodate various load conditions.

A 0.049-inch diameter steel wire as long as the film was wide served as as the electrode in the preliminary D.C. treatment. The wire was stretched taut over appropriately spaced electrode insulators and placed in close proximity to the surface of the grounded roll and parallel to the longitudinal axis thereof. The wire was connected to the high voltage terminal of a model PN–30–R (manufactured by Spellman High Voltage Company, New York, New York) high voltage D.C. power supply.

The details of each example are presented in Table I which follows. The voltage in each case was a little higher than that required for the necessary intimate contact between film and grounded roll in order to provide a margin of safety. To accumulate film of different widths, the ends of each treating electrode were masked by wrapping tightly with skived polytetrafluroroethylene tape so that the exposed slot length extended approximately ½ inch beyond either edge of the film web.

As Controls A, B, and C, respectively, Examples 1, 3 and 6 were rerun with the wire electrode in the preliminary D.C. treatment disconnected from the high voltage D.C. power supply. As control D, Example 1 was rerun with a voltage of 2.8 kilovolts in the preliminary D.C. treatment.

A brief but very effective test was employed to check for evidence of treatment not only on the "treated" surface of each film but also to check for evidence of treatment (or lack of release or anti-stick properties) on the reverse or "untreated" surface. A felt wick tipped marking pen (black in in methyl ethyl ketone) was stroked across the entire width of the film. The degree of wettability as observed by eye has been found roughly correlatable with the degree of treatment to improve cementability or, conversely, to the lack of release properties.

In Examples 1–13, the "treated" surface of each film exhibited a uniform level of wettability, i.e., the ink line was uniform in color and unbroken across the entire film width. On their "untreated" surfaces, the ink beaded, showing absolutely no evidence of wettability. The correlatability of this test was confirmed by laminating both surfaces of each film to sand-blasted steel blanks using an amine-cured epoxy resin adhesive system and measuring the peeling bond strength when separating the plies of each lamination. Laminations to the "treated" surfaces exhibited, uniformly across the entire film width, peeling bond strengths in excess of the tensile strength of the film itself in the case of the 1, 2 and 5-mil thick films and from 6,000 to 9,000 grams/inch for the thicker films.

In the marking ink test, the "treated" surfaces of Control Films A, B, C and D exhibited wettability. While peeling bond strength levels were high in the cementabiliy test, the level varied somewhat from lane to lane across the film width. However, the "untreated" surfaces of these control films showed a high, though non-uniform degree of wettability across the film width, which correlated with peeling bond strengths (in laminations to steel) ranging from 500 to 600 grams per inch of film width up to in excess of the tensile strength of the film itself. The "untreated" surface of Control Film D showed somewhat less wettability and less cementability than did the corresponding surfaces of Control Films A, B and C, indicating that while the voltage employed in the preliminary treatment was not entirely adequate, it did provide some improvement.

When the electrostatic charge is deposited on the film by passing the film over a layer of burlap, for example, rather than by the D.C. electrical treatment of this invention, prior to being subjected to the electrical discharge for adherability, the "untreated" surface of the film shows evidence of wettability in a varying pattern over its surface area. The film given such treatment is not satisfactorily held in a uniform manner on the electrically grounded rotating roll. Moreover, adhesive bond strengths of the "treated" surface are markedly inferior to those obtained when the D.C. electrical treatment of this invention is used to deposit the electrostatic charge on the film prior to the electrical discharge treatment for adherability wherein the subsequently treated surface of the film has no contact with any other material during the course of its treatment.

In the following Examples 1–13, the film width was 35 inches for Examples 1–6 and 15 inches for Examples 7–13; the distance from the pinning electrode and from the treating electrode in the high frequency electrical spark discharge treatment to the glass surface was 70 mils for Examples 1–6 and 9–12, 90 mils for Examples 7 and 13, and 110 mils for Example 8; the D.C. voltage in the preliminary pinning treatment was 7.5 kilovolts for Example 1, 13 kilovolts for Example 2, 13.5–15 kilovolts for Example 3, and 15 kilovolts for Examples 4–13; the power setting on the high frequency electrical discharge generator was 55 for Examples 1–13; and the films were cast from resins having a Specific Melt Viscosity, as defined in U.S. Patent 2,946,763, in the range of $0.70$–$0.80 \times 10^5$ poises for Examples 1–8 and in the range of $4$–$6 \times 10^5$ poises for Examples 9–13.

TABLE I

| Ex. No. | Nominal Film Thickness, Mils | Film Temp., °C. | Film and Roll Speed, Ft./Min. | High Frequency Electrical Spark Discharge-Generator | |
|---|---|---|---|---|---|
| | | | | Current, R.F. Amps. | Input Wattage |
| 1 | 1 | 38 | 12 | 1.1–1.3 | 250-350 |
| 2 | 2 | 51 | 10 | 1.2 | 300-350 |
| 3 | 5 | 58 | 6 | 1.2–1.3 | 300-350 |
| 4 | 10 | 61 | 3.5 | 1.2–1.3 | 350-400 |
| 5 | 20 | 88 | 2.5 | 1.2–1.3 | 250-350 |
| 6 | 40 | 100 | 1.8 | 1.5 | 350-370 |
| 7 | 60 | 94 | 1.6 | 1.2–1.3 | 320-350 |
| 8 | 90 | 100 | 1.5 | 1.5 | 100-150 |
| 9 | 10 | 56 | 6 | 1.2–1.5 | 100-200 |
| 10 | 20 | 76 | 3 | 1.2–1.5 | 100-200 |
| 11 | 30 | 83 | 2.1 | 1.4–1.5 | 100-200 |
| 12 | 40 | 90 | 1.67 | 1.4–1.5 | 100-200 |
| 13 | 60 | 96 | 1 | 1.4–1.5 | 240-260 |

Based on a large number of repetitive runs corresponding to Examples 1–6 above, representative values for charge density obtainable on the film surface in the electrostatic pinning step are 0.72, 0.80, 1.11, 1.84, 2.58 and 4.42 microcoulombs per square inch, respectively.

*Examples 14–19*

A group of different polymeric films were treated by high frequency electrical spark discharge means according to the process of this invention in an apparatus similar to the one employed for Examples 1–13. The grounded steel roll was 50 inches long, 12 inches in diameter and had no protective coating. Only one slotted electrode tube, 25 inches long and connected to a model H.F.S.G.–2 High Frequency Spark Generator was used in the electrical discharge treatment. The wire used in the preliminary D.C. treatment was 0.049 inch in diameter, 24 inches long, and was positioned approximately 3 inches from the treating electrode.

Flow rates for the gaseous treatment atmosphere supplied through the tubular electrode to the gap between the electrode and the grounded steel roll ranged from about 20 to 30 cubic feet per minute at a pressure of about 40 p.s.i.g. The remaining details of Examples 14–19 appear in Table II which follows.

As Controls A, B, C, D, E and F respectively, Examples 14 through 19 were rerun with the pinning electrode disconnected from the high voltage D.C. power supply.

Each film was printed on its treated surface with commercially recommended inks by both gravure and flexographic techniques and the resulting rolls of printed films stored at 45° C. At the end of a month's storage, each roll was unwound and the film examined for ink offset on the unprinted surface. No ink offset was detectable with the films of Examples 14–19 while each Control film exhibited ink offset to a highly objectionable degree. It was further observed that ink adhesion to the printed surfaces of the films of Examples 14–19 (as measured by the known pressure-sensitive tape stripping test) was, in general, better and more uniform across the web width than the adhesion to the printed surfaces of the corresponding Control films.

In the following Examples 14–19, the film of Examples 14–16 was biaxially oriented, heat-set polyethylene terephthalate, the film of Example 17 was linear polypropylene, the film of Example 18 was linear polyethylene, and the film of Example 19 was biaxially oriented, heat-set polyvinyl chloride; the film width was 24 inches for Examples 14–19; the distance from the pinning electrode to the roll surface was 50 mils for Examples 14–19 and the distance from the high frequency electrical spark discharge electrode to the roll surface was 10 mils for Examples 14–19; and the high frequency electrical spark discharge generator had a power setting of 69, a current R.F. amps of 2.1 and an input wattage of 1,100 for Examples 14–19.

TABLE II

| Ex. No. | Nominal Film Thickness, Mils | Roll Temp., °C. | Film and Roll Ft./Min. | Preliminary Treatment D.C. Voltage (Kilovolts) | High Frequency Electrical Spark Discharge Treatment Atmospheres |
|---|---|---|---|---|---|
| 14 | 0.5 | 70-80 | 50 | 8 | $Cl_2$. |
| 15 | 0.5 | 70-80 | 100 | 12 | $N_2/CCl_4$. |
| 16 | 1.0 | 70-80 | 100 | 14 | $N_2/CCl_4$. |
| 17 | 2.0 | 30 | 100 | 9 | $N_2$. |
| 18 | 2.0 | 30 | 150 | 10 | $N_2$. |
| 19 | 2.0 | 30 | 100 | 9 | $N_2$. |

*Examples 20–23*

Following the procedure of Examples 1–13, one surface of each of a series of perfluorocarbon copolymer films (of the type used in Examples 1–8) was subjected to electrical discharge treatment at room temperature by conducting each film at the rate of 5 feet per minute into the enclosing chamber of the apparatus and into contact with a 3-mil thick layer of polyethylene terephthalate film wrapped around an electrically grounded, 8-inch diameter steel roll rotating at the peripheral speed of 5 feet per minute. The two tubular treating electrodes, each connected to a model H.F.S.G.–2 High Frequency Spark Generator, were spaced 70 mils from the surface of the steel roll. The preliminary treatment electrode wire was spaced 0.125 inch from the surface of the steel roll and about 3.5 inch from the first tubular treating electrode. A nitrogen/glycidyl methacrylate atmosphere was supplied at about 20 p.s.i.g. to the treating electrode gaps. Laminations to steel were made and evaluated by the technique previously described, test strips being selected from various lanes across the width of each film web. Other conditions for each example and control appear in Table III.

The nominal film thickness was 5 mils for Example 20 and Control A, 1 mil for Example 21 and Control B, and 10 mils for Examples 22 and 23 and Control C; the film width was 15 inches for Examples 20 and 21 and Controls A and B, and 36 inches for Examples 22 and 23 and Control C; the nitrogen flow rate was 4 feet per minute for Examples 20 and 21 and Controls A and B, and 6 feet per minute for Examples 22 and 23 and Control C; and the high frequency spark generator power setting was 55 for Examples 20, 21 and 23 and Controls A, B and C, and 20 for Example 22.

TABLE III

| Ex. No. | Preliminary Treatment D.C. Voltage (Kilovolts) | Peeling Bond Strength, G./In. | |
|---|---|---|---|
| | | Treated Surface | Reverse Surface |
| Control A | | 5,400 | 100–1,200 |
| 20 | 12–14 | 5,400 | [1] 0–200 |
| Control B | | >1,400 | 100–>1,400 |
| 21 | 12–14 | >1,400 | [1] 0–200 |
| Control C | | 5,400–9,000 | 600–6,000 |
| 22 | 12–15 | 4,200–9,000 | [1] 0–200 |
| 23 | 20–22 | 1,000–6,600 | [1] 0–200 |

[1] Only an occasional spot at the higher value. Most areas tested "zero".

The invention claimed is:

1. A process for treating an organic thermoplastic polymeric film which comprises passing the organic thermoplastic polymeric film onto an electrically grounded moving surface; depositing an electrical charge of at least 0.23 microcoulomb per square inch on the upper surface of the film at least adjacent to each side edge of the film whereby said film adheres firmly to said moving surface; and thereafter subjecting said film to an electrical discharge at substantially atmospheric pressure between spaced electrodes, one of which is the electrically grounded moving surface, continuously applying to said electrodes an alternating current at a voltage in excess of 1,000 volts and at a frequency in excess of 350 cycles per second in an atmosphere effective to create an electrical discharge between said electrodes.

2. A process as in claim 1 wherein said organic thermoplastic polymeric film is selected from the group consisting of films of polytetrafluoroethylene, copolymers of 50–95% by weight tetrafluoroethylene with, correspondingly, 50–5% by weight hexafluoropropylene, polyvinyl chloride, polypropylene, polyethylene and polyethylene terephthalate.

References Cited by the Examiner

UNITED STATES PATENTS 2,864,755   12/1958   Rothacker _____ 204—165
3,018,189   1/1962    Traver _____ 117—47
3,068,528   12/1962   Owens _____ 264—22

JOHN H. MACK, *Primary Examiner.*

H. S. WILLIAMS, *Assistant Examiner.*